United States Patent [19]
Nonaka et al.

[11] Patent Number: 5,952,944
[45] Date of Patent: Sep. 14, 1999

[54] MODULATION DEVICE AND DEMODULATION DEVICE AND METHODS OF THE SAME

[75] Inventors: Chiaki Nonaka; Masahiro Shigenobu, both of Kanagawa, Japan

[73] Assignee: Sony Corporation, Tokyo, Japan

[21] Appl. No.: 08/957,590

[22] Filed: Oct. 24, 1997

[30] Foreign Application Priority Data

Oct. 31, 1996 [JP] Japan .............................. P08-290805

[51] Int. Cl.⁶ .................................................. H03M 7/46
[52] U.S. Cl. .................................................................. 341/59
[58] Field of Search ................................. 341/59, 53, 58, 341/95, 13

[56] References Cited

U.S. PATENT DOCUMENTS 5,682,153  10/1997  Ishiguro .................................... 341/53

*Primary Examiner*—Brian Young
*Attorney, Agent, or Firm*—Limbach & Limbach L.L.P.

[57] ABSTRACT

A modulation device and a demodulation device suitably performing DSV control while reducing the size and lowering the price of the hardware. Recording data is modulated at a modulator. In a DSV calculator, the DSV value of a modulated data is calculated in units of 1 DSV frame. A comparator outputs a sign comparison result of a DSV value cumulatively added from the start of recording and a DSV value to a DSV control bit insertion unit. The DSV control bit insertion unit inserts bits of DSV control data in accordance with the comparison result at a predetermined insertion position of the modulated data delayed by exactly an amount of 1 DSV frame. Thereafter, the modulated data is subjected to NRZ modulation.

14 Claims, 10 Drawing Sheets

MODULATION DEVICE AND DEMODULATION DEVICE AND METHODS OF THE SAME

BACKGROUND OF THE INVENTION

1. Field of the Invention

The present invention relates to a modulation device used when recording data on an optical disc and a method of the same and to a demodulation device used when reproducing the data from the optical disc and a method of the same.

2. Description of the Related Art

When recording a signal on an optical disc, the original signal is modulated to a signal suitable for recording on the optical disc.

As such a modulation system, there are for example the eight-to-fourteen modulation (EMF) system used for compact discs (CD) and mini discs (MD) and the 8–16 modulation system used in a digital video disc (DVD). In these modulation systems, however, the efficiency of the conversion (ratio of data length after modulation with respect to the data length before the modulation) is not that good (high). Namely, there is a high redundancy of data after modulation.

From the viewpoint of the conversion efficiency, the run-length modulation system, specifically, the RLL (1,7) modulation system, is excellent. The RLL (1,7) system modulates the original data to a minimum run of "1" and a maximum run of "7" bits of data.

In this RLL (1,7) modulation system, however, the low frequency component of the modulated signal is not controlled, so the low frequency component contained in the modulated signal is larger than that in the case of the EFM system, 8–16 modulation system, and other modulation systems which control the low frequency component.

Note that the low frequency component of the modulated signal is generally controlled by controlling the digital sum value (DSV). Here, the "DSV" is the sum of the symbols successively found from the point of time of the start of the waveform train when defining the symbols "1" and "0" in the recorded waveform train as "+1" and "–1", respectively.

When a low frequency component is contained in the modulated signal in this way, in a read only memory (ROM) disc on which data is recorded at pits on the disc, there is a problem in that this low frequency component will leak into the servo signal of an optical pick-up at the time of reproduction—which will have an adverse influence upon the servo control.

Further, if there is such a low frequency component, the demodulation circuit must be provided with a function for removing the influence of such a low frequency component, so there is a problem that the demodulation circuit becomes complex and expensive.

Note that, in a magneto-optical (MO) disc or other random access memory (RAM) disc, the servo control of the head is carried out by servo control marks formed on the disc, therefore the servo control is not influenced by the low frequency component contained in the reproduced signal.

In another matter, there are discs comprised of a ROM region for recording data by a pit train on the outside of which is provided a RAM region constituted by an MO disc etc. In such a disc, since the servo signal is not generated from a magnetic signal, it is not necessary to perform DSV control in the MO or other RAM region, but it is necessary to perform a certain degree of DSV control in the ROM region for the above reason. Here, a system may be considered where the DSV control is not performed when accessing the RAM region and is performed only when accessing the ROM region. In this system, however, It Is necessary to Individually provide a modulation circuit and demodulation circuit for accessing the RAM region and the ROM region, so the device becomes larger in size and higher in cost.

On the other hand, when DSV control is carried out for both of the RAM region and the ROM region, the redundancy of the data recorded in the RAM region becomes high, so the effective amount of data which can be recorded in the RAM region is reduced.

SUMMARY OF THE INVENTION

An object of the present invention is to provide a modulation device and demodulation device for suitably performing DSV control when recording on and reproducing from a disc provided with both of a ROM region and a RAM region while reducing the size of the hardware, lowering the price, and increasing the amount of data which can be recorded and methods of the same.

To solve the above problems of the related art and achieve the above object, according to a first aspect of the present invention, there is provided a modulation device for performing modulation of recording data to be recorded on an optical disc, provided with a modulating means for run-length modulating the recording data and a DSV control data inserting means for inserting, at a predetermined insertion position other than at the synchronization data of the modulated data, DSV control data comprised by two or more bits and adjusting the DSV value while observing the restrictions prescribed by the run-length modulation in relationship with the data patterns before and after the insertion position.

In the modulation device of the first aspect of the present invention, since the run-length modulation system is adopted, a high conversion efficiency can be obtained. Also, since DSV control is carried out, the low frequency component contained in the modulated signal can be effectively suppressed. For this reason, for example, if the device is used in a recording device for recording on a disc provided with both of a ROM region and a RAM region, it is possible to use a single modulation device and reduce the redundancy of the recording data and obtain a large effective amount of recording in the RAM region. Also, it is possible to suppress the low frequency component of the modulated signal exerting an adverse effect upon the servo control of the optical pick-up when recording in the ROM region.

According to a second aspect of the present invention, there is provided a demodulation device for demodulating recording data modulated by the run-length system and having inserted, at a predetermined insertion position other than that of the synchronization data, DSV control data comprised by two or more bits and adjusting the DSV value while observing the restrictions prescribed by the run-length modulation in relationship with the data patterns before and after the insertion position, provided with a synchronization data detecting means for detecting synchronization data contained in the recording data; a DSV control data position detecting means for detecting the position of the DSV control data in the recording data based on the detected synchronization data; a DSV control data removing means for removing the DSV control data contained in the recording data based on the detected position of the DSV control data; and a demodulating means for run-length demodulating the recording data from which the DSV control data is removed.

According to third and fourth aspects of the present invention, there are provided methods for modulation and demodulation based on the above.

BRIEF DESCRIPTION OF THE DRAWINGS

These and other objects and features of the present invention will become clearer from the following description of the preferred embodiments given with reference to the accompanying drawings, wherein.

DESCRIPTION OF THE PREFERRED EMBODIMENTS

Below, an explanation will be made of an optical disc device according to an embodiment of the present invention.

Figure 1:
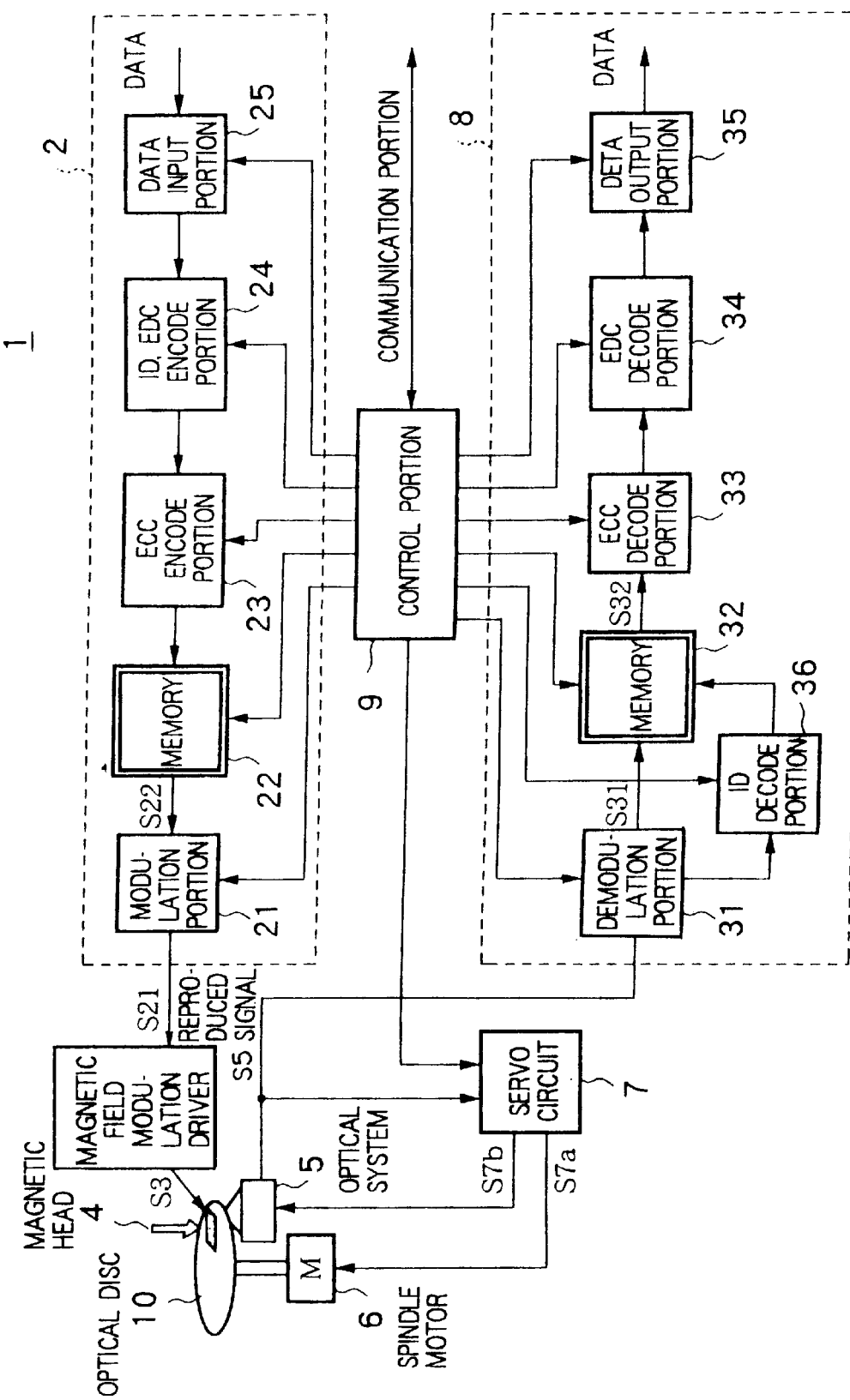
FIG. 1 is a view of the configuration of an optical disc device according to a first embodiment of the present invention.

As shown in FIG. 1, an optical disc device 1 has an encode module 2, a magnetic field modulation driver 3, a magnetic field head 4, an optical system 5, a spindle motor 6, a servo circuit 7, a decode module 8, and a controller 9 and performs recording on and reproduction from an optical disc 10.

Figure 2:
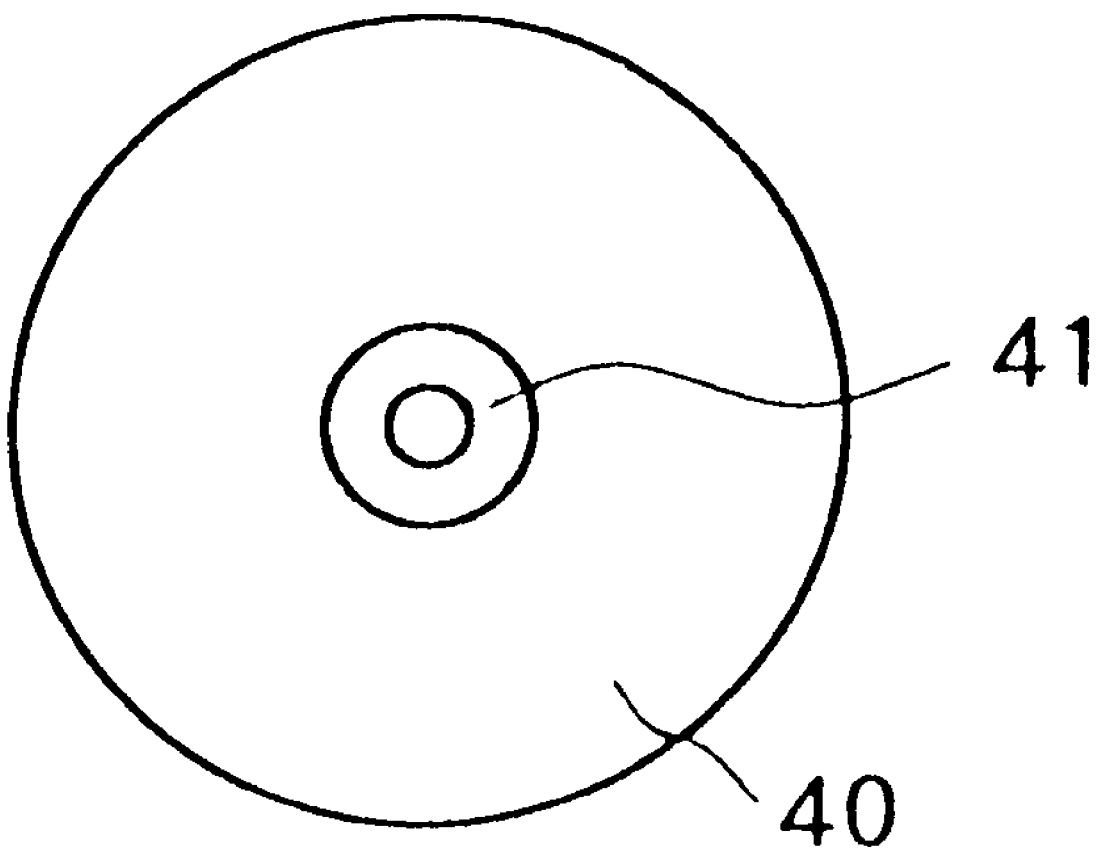
FIG. 2 is a view for explaining the configuration of the optical disc shown in FIG. 1.

The optical disc 10 has a ROM region 41 inside a RAM region 40 rewritable by a magneto-optical recording system as shown in FIG. 2. The RAM region 40 is a region in which the recording is carried out by raising the temperature higher than the Currie temperature at a local point by a laser beam and performing vertical magnetization by an external magnetic field applied there and is comprised by an MO disc etc. on which the reading is carried out by utilizing a Kerr effect of a slight rotation of a polarization surface when the light is irradiated. Also, the ROM region 41 is an exclusive reproduction region in which the data is recorded by the pit train.

The magnetic field modulation driver 3 generates a magnetic field modulated signal from the modulated data S21 input from the modulation portion 21 and records this magnetic field modulated signal S3 on the optical disc 10 via a magnetic field head 4.

The optical system 5 performs tracking servo control and focus servo control based on a control signal S7b from the servo circuit 7.

The spindle motor 6 rotates the optical disc 10 based on a drive signal S7a from the servo circuit 7.

Encode Module

The encode module 2 has a data input portion 25, an identification (ID) and error detection code (EDC) encode portion 24, an error correction code (ECC) encode portion 23, a memory 22, and a modulation portion 21.

In the encode module 2, the recording data is input from a data input portion 25 under the control of the controller 9, an ID and EDC are added to this recording data at the ID EDC encode portion 24, and an ECC is added at the ECC encode portion 23 and then stored in the memory 22. Here, ID indicates an address data added to the head of the blocks of the data. The recording data is read from the memory 22, the RLL (1,7) modulation mentioned later is carried out in the modulation portion 21, and the modulated data S21 is output to the magnetic field modulation driver 3.

A detailed explanation will be made of the modulation portion 21.

Figure 3:
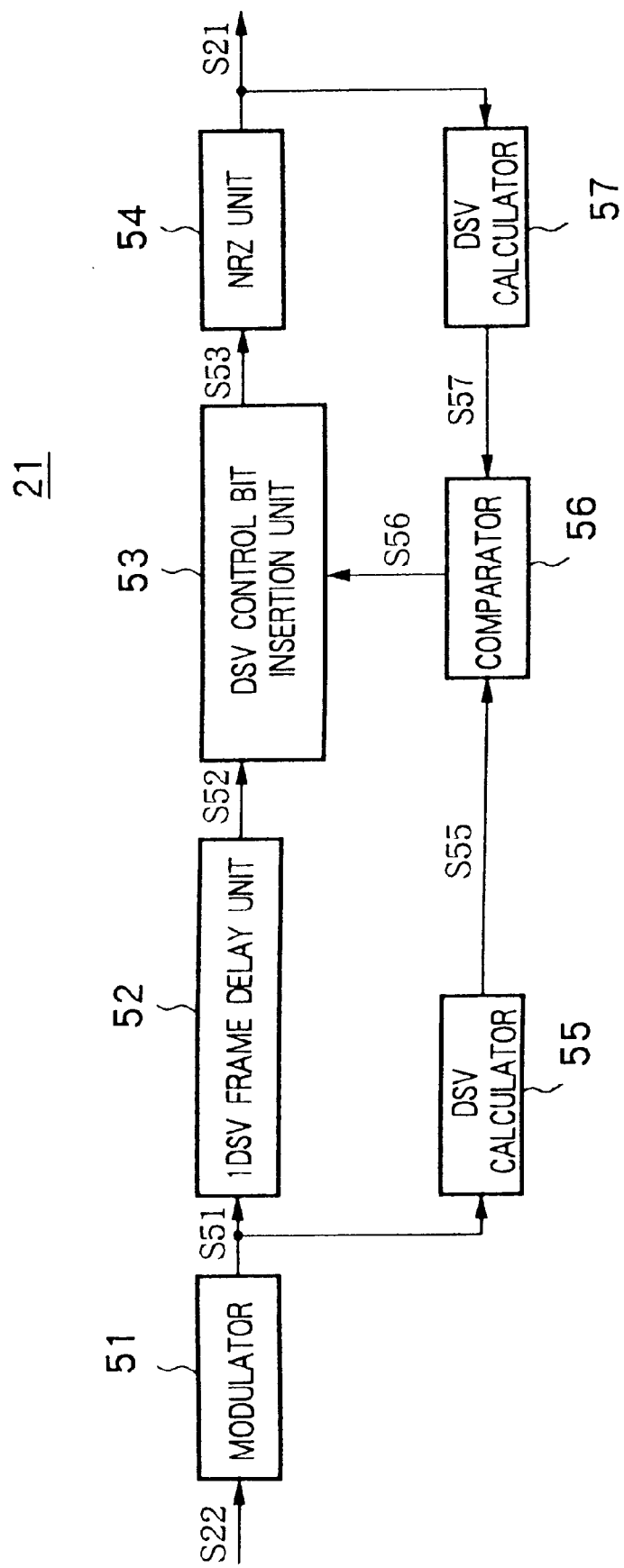
FIG. 3 is a view of the configuration of a modulation portion shown in FIG. 1.

FIG. 3 is a view of the configuration of the modulation portion 21.

1. As shown in FIG. 3, the modulation portion 21 has a modulator 51, a 1 DSV frame delay unit 52, a DSV control bit insertion unit 53, an NRZ unit 54, DSV calculators 55 and 57, and a comparator 56.

The modulator 51 receives as Its input the recording data S22 from the memory 22 shown in FIG. 1, applies the RLL (1,7) modulation to this recording data S22, and outputs the modulated data S51 to the 1 DSV frame delay unit 52 and the DSV calculator 55.

The 1 DSV frame delay unit 52 delays the modulated data S51 by exactly an amount of 1 DSV frame and outputs this as the modulated data S52 to the DSV control bit insertion unit 53. This delay is given for the timing with the DSV calculation time in the DSV calculator 55.

The DSV calculator 55 calculates the DSV for 1 DSV frame's worth of the modulated data S51 and outputs the DSV value S55 to the comparator 56.

The DSV calculator 57 cumulatively adds the DSV of the modulated data S21 after the end of the DSV control from the start of recording and outputs the DSV value S57 as the cumulative result thereof to the comparator 56.

The comparator 56 compares the signs of the DSV value S55 and the DSV value S57, decides whether or not the signs are identical, and outputs the sign comparison result S56 to the DSV control bit insertion unit 53.

Figure 4A:
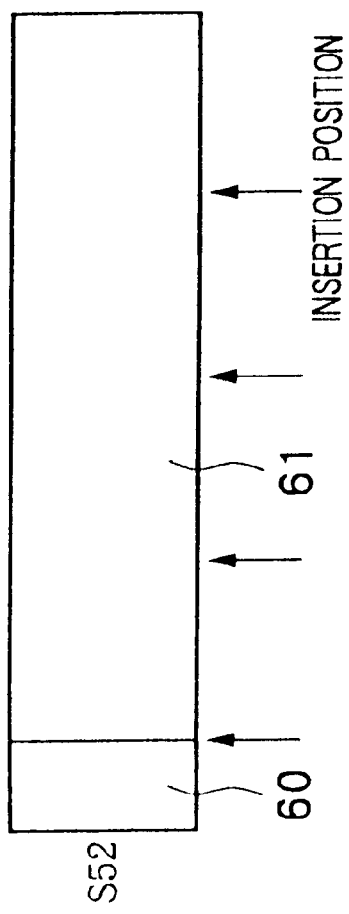
FIGS. 4A and 4B show modulated data before inserting the DSV control data; and modulated data after inserting the DSV control data, respectively.
Figure 4B:
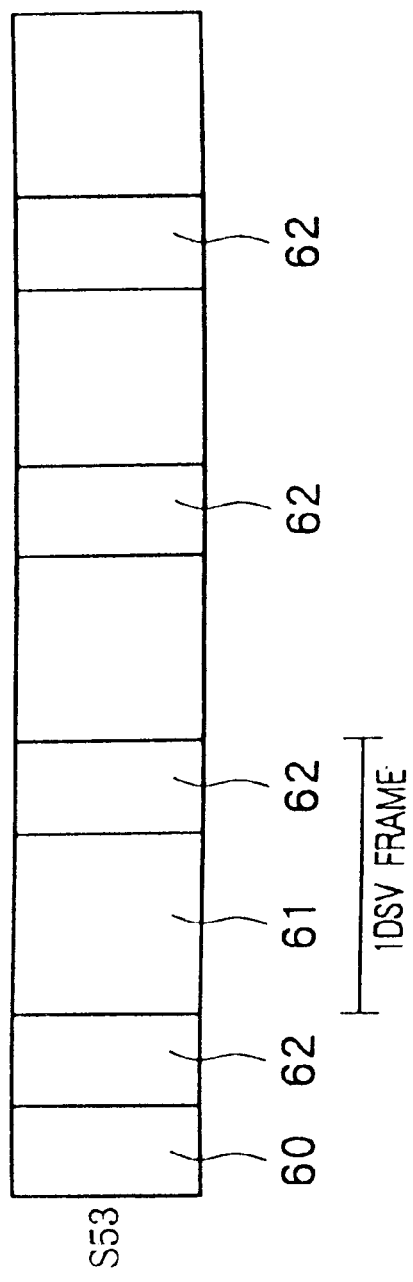

The DSV control bit insertion unit 53 inserts the DSV control data 62 at the predetermined insertion position of the modulated data S52 shown in FIG. 4A according to a predetermined rule based on the sign comparison result S56, generates the modulated data S53 as shown in FIG. 4B, and outputs this to the NRZ unit 54. The DSV control data 62 is inserted at a position away from the synchronization signal 60 of the modulated data S52 by exactly a predetermined number of bits. In the present embodiment, the insertion positions of the DSV control data 62 in the modulated data S52 are at equal intervals, but it is possible even if these insertion positions are not at equal intervals. Note that, the 1 DSV frame is comprised by a pair of modulated data 61 and DSV control data 62.

Below, a detailed explanation will be made of the processing In the DSV control bit Insertion unit 53.

In the DSV control bit insertion unit 53, the DSV control data 62 is inserted into the modulated data S52 at for example predetermined intervals while observing the restriction by the RLL (1,7).

FIGS. 5A to 5G are views for explaining the relationship between the contents and insertion positions of the DSV control data 62 in a case where 3 bits of DSV control data 62 are inserted into the modulated data S52.

Figure 5A:
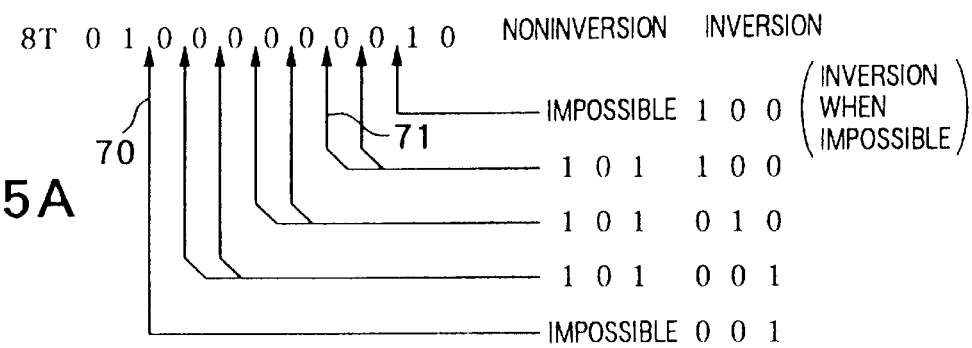
FIGS. 5A to 5G are views for explaining the relationship between contents and insertion positions of the DSV control data where 3 bits of DSV control data are inserted into the modulated data.
Figure 5B:
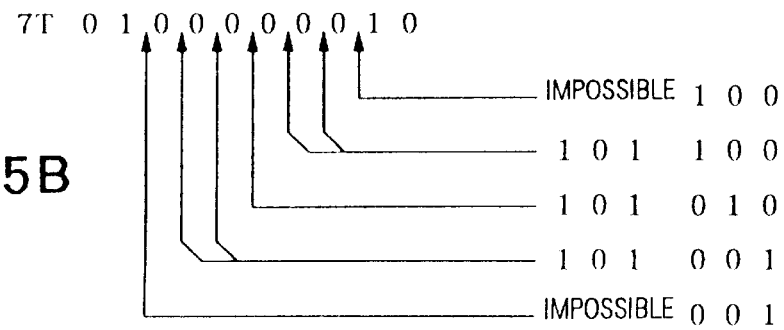
Figure 5C:
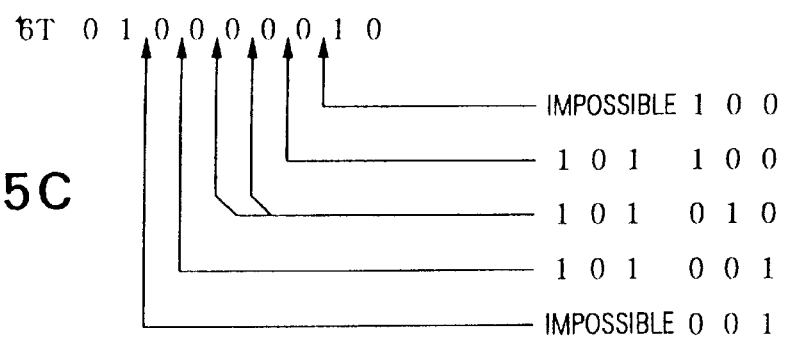
Figure 5D:
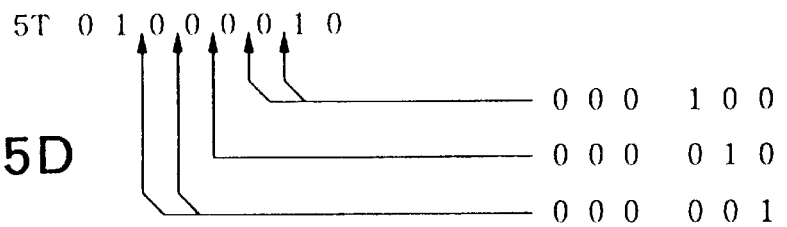
Figure 5E:
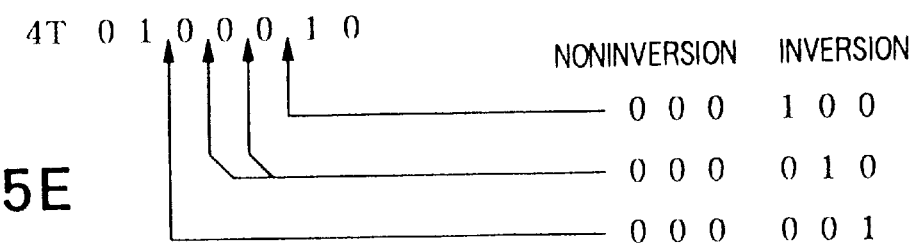
Figure 5F:
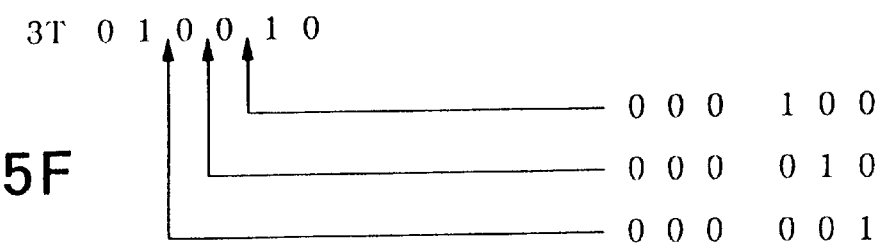
Figure 5G:

FIGS. 5A to 5G are views of the cases of different numbers of "0's" existing between adjoining "1's" in the modulated data S52. FIG. 5A shows a case where seven "0's" continue; FIG. 5B shows a case where six "0's" continue; FIG. 5C shows a case where five "0's" continue; FIG. 5D shows a case where four "0's" continue; FIG. 5E shows a case where three "0's" continue; FIG. 5F show a case where two "0's" continue; and FIG. 5G shows a case where there is one "0".

Further, the DSV control bit insertion unit 53 inserts the DSV control data 62 corresponding to "Inversion" shown in FIGS. 5A to 5G when the DSV value S55 and the DSV value S57 have identical signs based on the sign comparison result S56, while inserts the DSV control data 62 corresponding to "noninversion" when they do not have the same sign. Here, the DSV control data 62 indicated in "inversion" contains an odd number of "1's", i.e., one in the present embodiment, and decreases (increases in a minus direction) the DSV value S57 from the DSV calculator 57 by the insertion into the DSV control data 62. On the other hand, the DSV control data 62 indicated in "noninversion" contains an even number of "1's", including zero, i.e., two in the present embodiment, and increases (increases in a plus direction) the DSV value S57 from the DSV calculator 57 by the insertion into the DSV control data 62.

By selectively using the DSV control data 62 based on the sign comparison result S56 in this way, the absolute value of the DSV value S57 from the DSV calculator 57 can be reduced.

For example, in the case shown in FIG. 5A, when the DSV control data 62 is inserted into the position of the modulated data S52 indicated by an arrow 70, in order to reduce the DSV value of the modulated data by the insertion of the DSV control data 62, if the DSV value S55 and the DSV value S57 have the identical sign, "001" indicated in "inversion" is inserted as the DSV control data 62.

By this, the modulated data S52 of "01000000010" has inserted into it the DSV control data 62 of "001" and becomes the modulated data S53 of "01001000000010".

In the DSV control bit insertion unit 53, the DSV control data 62 must be inserted while observing the restriction of RLL (1,7), therefore there arise cases where the DSV value of the modulated data cannot be reduced in 3 or less bits of DSV control data 62. For example, in the case shown in FIG. 5A, when 3 bits of DSV control data 62 containing an even number of "1's" is inserted at the position of the modulated data indicated by an arrow 70, a part where "1's" continue is always produced and the restriction of RLL (1,7) to make the minimum inversion interval "1" can no longer be observed. In such a case, in FIGS. 5A to 5G, "not possible" is indicated.

In the DSV control bit insertion unit 53, when "noninversion" must be selected in this way and when the restriction of RLL (1,7) can no longer be observed, the "inversion" DSV control data 62 is used. At this time, the absolute value of the DSV value S57 is increased, but since the frequency of occurrence of such a situation is low, the DSV value can be effectively suppressed as a whole.

The "inversion" DSV control data 62 shown in FIGS. 5A to 5G is determined from the viewpoints of not only observing the restriction of RLL (1,7), but also reducing the influence of the inter-code interference. Namely, in general, it is known that the larger the difference of lengths of adjoining T (marks) in the inter-code interference, the larger the influence, but the DSV control data 62 shown in FIGS. 5A to 5G have been determined so as to make the difference of lengths of adjoining T (marks) as small as possible.

For example, the 3 bits of DSV control data 62 to be inserted into the position of the arrow 71 shown in FIG. 5A may be either of "001", "010", or "100", but from the viewpoint of reduction of inter-code interference, "100", with which the difference of sizes of left and right T's (marks) becomes the smallest, is selected.

Decode Module

The decode module 8 has a data output portion 35, an EDC decode portion 34, an ECC decode portion 33, a memory 32, a demodulation portion 31, and an ID decode portion 36.

In the decode module 8, a reproduction signal S5 from the optical system 5 is demodulated at the demodulation portion 31, and the demodulated signal S31 is stored in the memory 32. At this time, the ID decode portion 36 records the demodulated data in a predetermined recording region of the memory 32 based on the ID data input from the controller 9 and the ID data detected from the demodulated signal by the demodulation portion 31.

Next, the demodulated data S32 read from the memory 32 is subjected to the ECC decoding processing in the ECC decode portion 33 and subjected to the EDC decoding processing at the EDC decode portion 34 and then output as the reproduced data via the EDC decode portion 34.

Below, a detailed explanation will be made of the demodulation portion 31.

Figure 6:
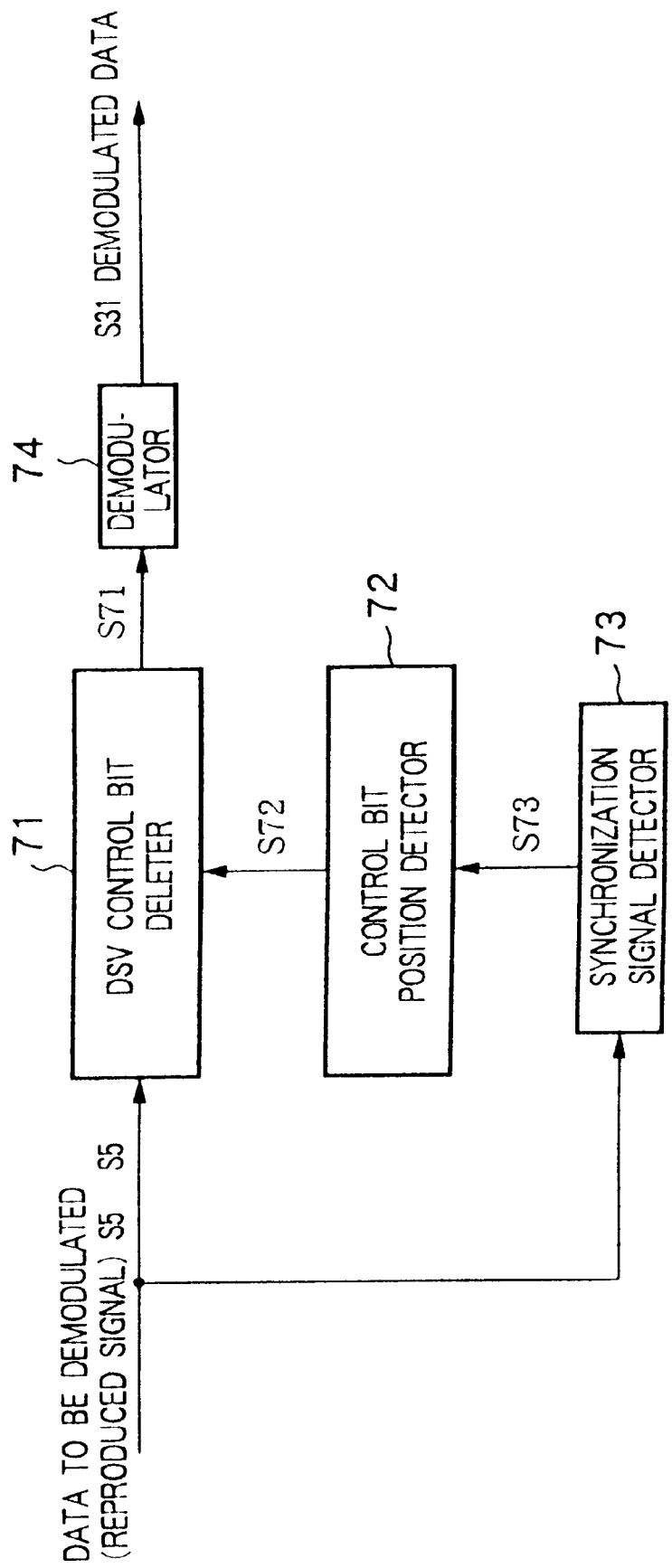
FIG. 6 is a view of the configuration of a demodulation portion shown in FIG. 1.

FIG. 6 is a view of the configuration of the demodulation portion 31.

As shown in FIG. 6, the demodulation portion 31 has a DSV control bit deleter 71, a control bit position detector 72, a synchronization signal detector 73, and a demodulator 74.

In the demodulation portion 31, the synchronization signal contained in the reproduced signal S5 is detected at the synchronization signal detector 73, and the detection signal S73 indicating that detection timing is output to the control bit position detector 72.

The control bit position detector 72 specifies the position of the DSV control data (bit) 62 shown in FIG. 4B from the detection signal S73 and outputs the specified signal S72 to the DSV control bit deleter 71.

Then, the DSV control bit deleter 71 deletes the DSV control data 62 from the reproduction signal S5 based on the specified signal S72 and outputs the data S71 obtained by connecting the front and rear of this to the demodulator 74.

The demodulator 74 performs the RLL (1,7) demodulation for the data S71 and outputs the demodulated data S31 to the memory 32 shown in FIG. 1.

As explained above, according to the optical disc device 1, by modulating the recording data by the RLL (1,7) modulation system having a good conversion efficiency, the recording data can be efficiently recorded in the RAM region of the optical disc 10 with a low redundancy.

Further, according to the optical disc device 1, since DSV control is carried out for the modulated data, the low frequency component of the recording data to be recorded in the ROM region of the optical disc 10 can be effectively suppressed, and an occurrence of adverse influence upon the servo control of the optical pick-up etc. can be effectively avoided.

Further, according to the optical disc device 1, the modulation circuit and the demodulation circuit can be commonly used in the ROM region and the RAM region, so the circuit can be reduced in size and the cost can be lowered.

Second Embodiment

The optical disc device according to the second embodiment is basically the same as the optical disc device of the first embodiment shown in FIG. 1, but differs from the latter in the point that 2 bits of DSV control data are inserted into the modulated data S52 in the DSV control bit insertion unit 53 of the modulation portion 21 shown in FIG. 3.

FIGS. 7A to 7G are views for explaining the relationship between the contents and insertion positions of the DSV control data 62 in a case where 2 bits of DSV control data 62 are inserted into the modulated data S52.

Figure 7A:
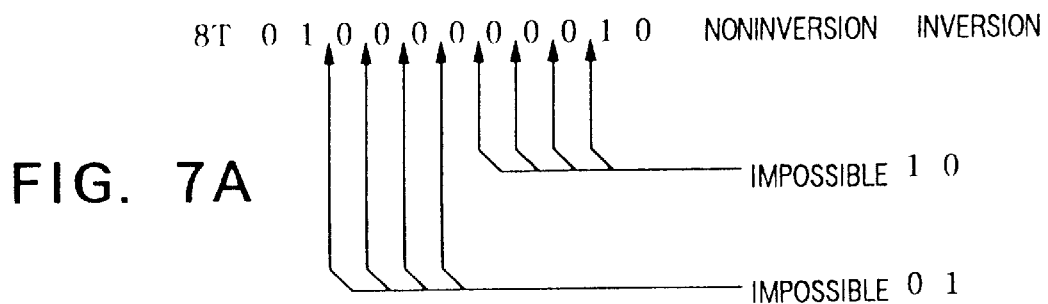
FIGS. 7A to 7G are views for explaining the relationship between contents and insertion positions of the DSV control data where 2 bits of DSV control data are inserted into the modulated data.
Figure 7B:
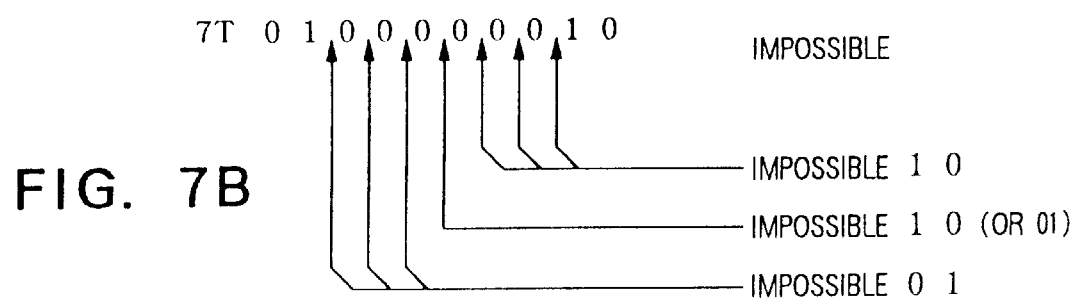
Figure 7C:
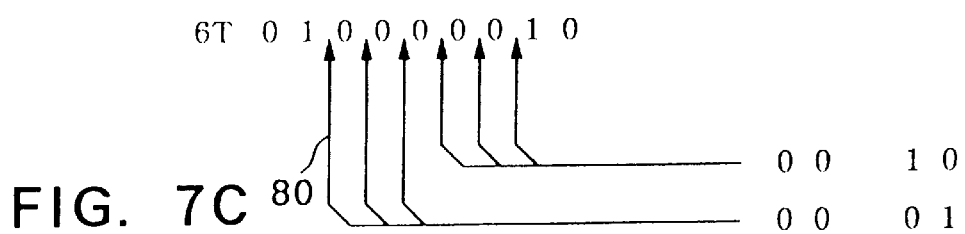
Figure 7D:
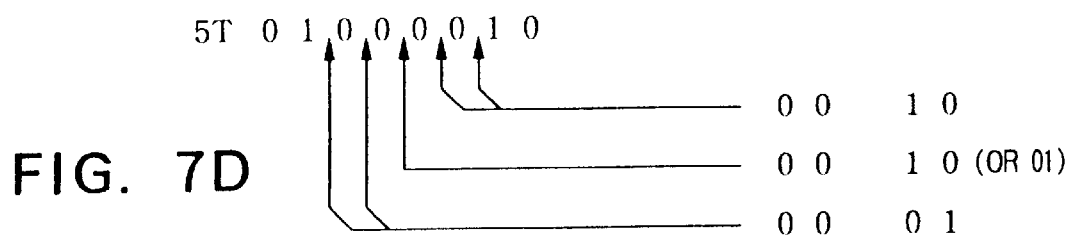
Figure 7E:
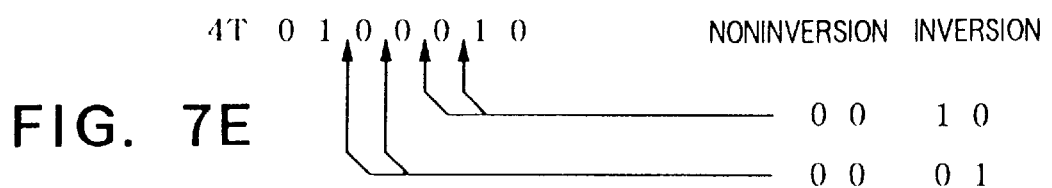
Figure 7F:
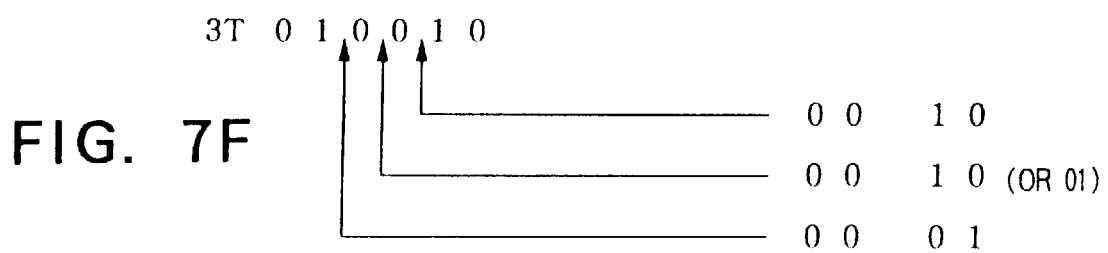
Figure 7G:
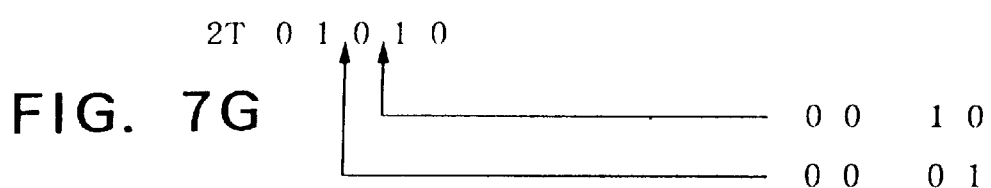

FIGS. 7A to 7G are views of the cases of different numbers of "0's" existing between adjoining "1's" in the modulated data S52. FIG. 7A shows a case where seven "0's" continue; FIG. 7B shows a case where six "0's" continue; FIG. 7C shows a case where five "0's" continue; FIG. 7D shows a case where four "0's" continue; FIG. 7E shows a case where three "0's" continue; FIG. 7F show a case where two "0's" continue; and FIG. 7G shows a case where there is one "0".

Further, the DSV control bit insertion unit 53 inserts the DSV control data 62 corresponding to "inversion" shown in FIGS. 7A to 7G when the DSV value S55 and the DSV value S57 have an identical sign based on the sign comparison result S56, while inserts the DSV control data 62 corresponding to "noninversion" when they do not have the same sign. Here, the DSV control data 62 indicated in "inversion" contains an odd number of "1's", i.e., one in the present embodiment, and does not change the DSV value S57 from the DSV calculator 57 by the insertion into the DSV control data 62. On the other hand, the DSV control data 62 indicated in "noninversion" contains an even number of "1's", including zero, i.e., zero in the present embodiment, and decreases (increases in the minus direction) the DSV value S57 from the DSV calculator 57 by the insertion into the DSV control data 62.

In this way, by selectively using the DSV control data 62 based on the sign comparison result S56, the absolute value of the DSV value S57 from the DSV calculator 57 can be reduced.

For example, in the case shown in FIG. 7D, when the DSV control data 62 is inserted into the position of the modulated data S52 indicated by an arrow 80, in order to reduce the DSV value of the modulated data by the insertion of the DSV control data 62, if the DSV value S55 and the DSV value S57 have the identical sign, "01" indicated in "inversion" is inserted as the DSV control data 62.

By this, the modulated data S52 of "010000010" has inserted in it the DSV control data 62 of "01" and becomes the modulated data S53 of "01010000010".

In the present embodiment as well, the DSV control data 62 shown in FIGS. 7A to 7G is determined from the viewpoint of not only observing the restriction of RLL (1,7), but also reducing the influence of the inter-code interference.

According to the optical disc device of the second embodiment as well, an effect similar to that by the optical disc device 1 of the first embodiment mentioned before can be obtained.

Third Embodiment

Figure 8:
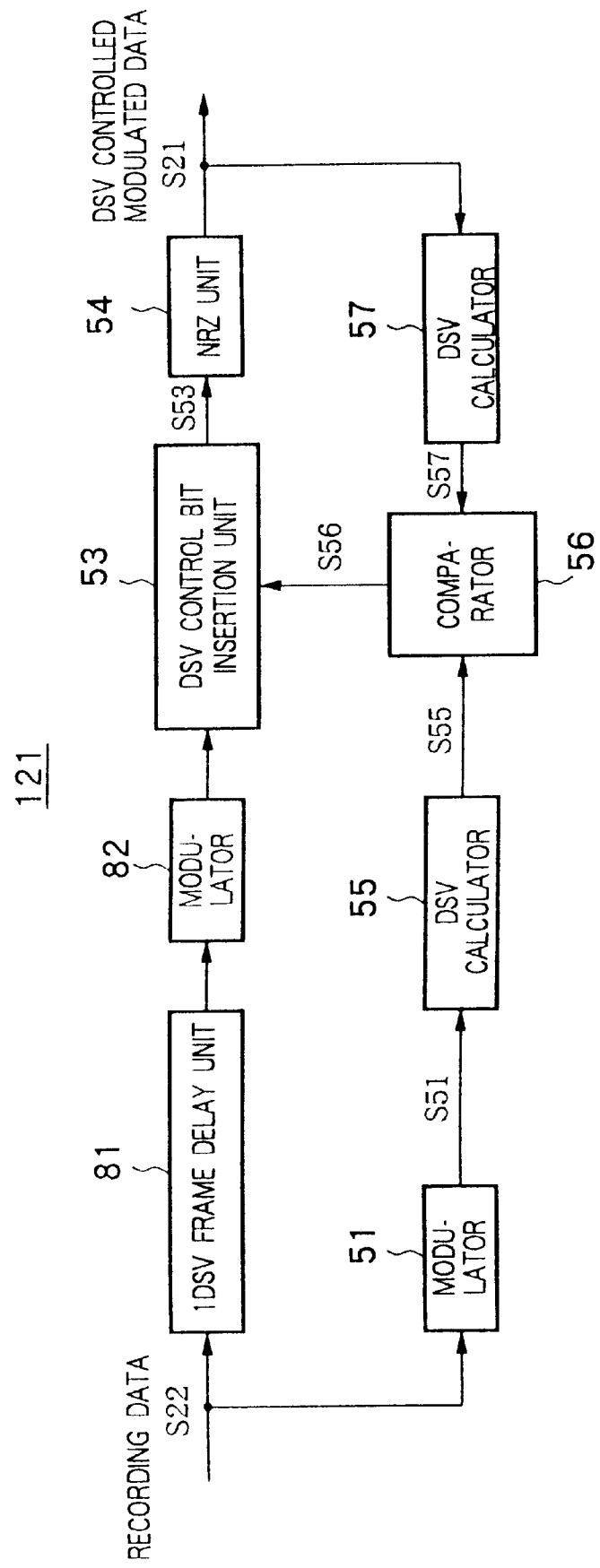
FIG. 8 is a view of the configuration of the modulation portion of an optical disc device according to a third embodiment of the present invention.

The optical disc device of the third embodiment is basically the same as the optical disc device of the first embodiment shown in FIG. 1, but as shown in FIG. 8, the modulation portion 121 is different from the modulation portion 21 shown in FIG. 3.

Note that, in FIG. 8, the same references are given to the same constituent elements as those of FIG. 3.

As shown in FIG. 8, the modulation portion 121 has modulators 51 and 82, a 1 DSV frame delay unit 81, a DSV control bit insertion unit 53, an NRZ unit 54, DSV calculators 51 and 57, and a comparator 56.

One of the data processing series of the modulation portion 121 is the same as the modulation portion 21 in the point that it modulates the recording data S22 by the modulator 51, calculates 1 DSV frame's worth of the DSV value in the DSV calculator 55 based on the modulated data S51, and outputs this DSV value S55 to the comparator 56.

The other data processing series of the modulation portion 121 is different from the modulation portion 21 in the point that the recording data S22 is delayed by exactly an amount of 1 DSV frame in the 1 DSV frame delay unit 81, then the RLL (1,7) modulation is carried out at the modulator 82, and this modulated data S82 is output to the DSV control bit insertion unit 53.

Note that, according to the optical disc device of the present embodiment as well, a similar effect to that by the optical disc device 1 of the first embodiment can be obtained.

The present invention is not limited to the above embodiments. For example, in the above embodiments, RLL (1,7) modulation was used, but the present invention can be applied to other run-length modulation too.

Further, in the above embodiments, as the DSV control data 62, data comprised by 3 bits and 2 bits were exemplified, but it is also possible to use data comprised by 4 bits or more as the DSV control data 62.

Further, in the present invention, in the modulation portion 21, where the restriction prescribed by the run-length modulation can no longer be observed if the DSV control data 62 for reducing the absolute value of the DSV value S57 from the DSV calculator 57 is inserted into the modulated data S52, it is also possible not to perform the adjustment of DSV, but insert the data making the inter-code interference the smallest in relation with the data patterns before and after the insertion position into the insertion position in place of the DSV control data.

Further, in the above embodiments, an MO region was exemplified as the RAM region of the optical disc 10, but it is also possible to use the magnetic recording and reproduction region as this RAM region.

As explained above, according to the modulation device and demodulation device of the present invention and the methods of the same, when recording on and reproducing from a disc provided with both of a ROM region and RAM region, the DSV control can be suitably carried out while reducing the size of the device, lowering the cost, and increasing the amount of data which can be recorded.

What is claimed is:

1. A modulation device for performing modulation of recording data to be recorded on an optical disc, comprising:

a modulating means for run-length modulating the recording data;

a DSV control data inserting means for inserting, at a predetermined insertion position other than at the synchronization data of the modulated data, DSV control data comprised by two or more bits and adjusting the DSV value while observing the restrictions prescribed by the run-length modulation in relationship with the data patterns before and after the insertion position;

a first DSV value calculating means for calculating in predetermined block units the DSV value of the modulated data before inserting the DSV control data; and a second DSV value calculating means for cumulatively adding the DSV values of the modulated data after the DSV control data is inserted from the start of recording; wherein the DSV control data inserting means inserts the predetermined DSV control data into the modulated data based on the DSV values of the first DSV value calculating means and the second DSV value calculating means.

2. A modulation device as set forth in claim 1, wherein the DSV control data inserting means inserts into the modulated data the DSV control data for reducing the absolute value of the DSV value calculated by the second DSV value calculating means.

3. A modulation device as set forth in claim 1, wherein the DSV control data inserting means inserts into the modulated data the DSV control data increasing the absolute value of the DSV value of the second DSV value calculating means and capable of observing the restriction prescribed by the run-length modulation when the restriction prescribed by the run-length modulation can no longer be observed if the DSV control data for reducing the absolute value of the DSV value of the second DSV value calculating means is inserted into the modulated data.

4. A modulation device for performing modulation of recording data to be recorded on an optical disc, comprising:
   a modulating means for run-length modulating the recording data; and
   a DSV control data inserting means for inserting, at a predetermined insertion position other than at the synchronization data of the modulated data, DSV control data comprised by two or more bits and adjusting the DSV value while observing the restrictions prescribed by the run-length modulation in relationship with the data patterns before and after the insertion position,
   wherein the DSV control data inserting means inserts data making an inter-code interference the smallest in relationship with the data patterns before and after the insertion position at the insertion position in place of the DSV control data when the restriction prescribed by the run-length modulation can no longer be observed if DSV control data for reducing the absolute value of the DSV value of the second DSV value calculating means is inserted into the modulated data.

5. A modulation device for performing modulation of recording data to be recorded on an optical disc, comprising:
   a modulating means for run-length modulating the recording data; and
   a DSV control data inserting means for inserting, at a predetermined insertion position other than at the synchronization data of the modulated data, DSV control data comprised by two or more bits and adjusting the DSV value while observing the restrictions prescribed by the run-length modulation in relationship with the data patterns before and after the insertion position,
   wherein the DSV control data inserting means uses as the DSV control data a candidate of the DSV control data capable of adjusting the DSV value while observing the restriction prescribed by the run-length modulation which gives the smallest inter-code interference at the insertion position when there are a plurality of the same.

6. A modulation device as set forth in claim 1, 2, 3, 4 or 5, wherein the optical disc is provided with an exclusive reproduction region and a recordable and reproducible region.

7. A demodulation device for demodulating recording data modulated by the run-length system and having inserted, at a predetermined insertion position other than that of the synchronization data, DSV control data comprised by two or more bits and adjusting the DSV value while observing the restrictions prescribed by the run-length modulation in relationship with the data patterns before and after the insertion position, comprising:
   a synchronization data detecting means for detecting synchronization data contained in the recording data;
   a DSV control data position detecting means for detecting the position of the DSV control data in the recording data based on the detected synchronization data;
   a DSV control data removing means for removing the DSV control data contained in the recording data based on the detected position of the DSV control data; and
   a demodulating means for run-length demodulating the recording data from which the DSV control data is removed.

8. A modulation method for performing the modulation of recording data to be recorded on an optical disk, comprising the steps of:
   run-length modulating the recording data;
   inserting, at a predetermined insertion position other than that of the synchronization data, DSV control data comprised by two or more bits and adjusting the DSV value while observing the restrictions prescribed by the run-length modulation in relationship with the data patterns before and after the insertion position;
   finding a first DSV value obtained by calculating in predetermined block units the DSV value of the modulated data before insertion of the DSV control data;
   finding a second DSV value obtained by cumulatively adding from the start of recording the DSV values of the modulated data after the DSV control data is inserted; and
   inserting the predetermined DSV control data into the modulated data based on the first DSV value and the second DSV value.

9. A modulation method as set forth in claim 8, wherein DSV control data for reducing the absolute value of the second DSV value is inserted into the modulated data.

10. A modulation method as set forth in claim 8, wherein DSV control data increasing the absolute value of the second DSV value, but capable of observing the restriction prescribed by the run-length modulation is inserted into the modulated data in place of the DSV control data when the restriction prescribed by the run-length modulation can no longer be observed if DSV control data reducing the absolute value of the second DSV value is inserted into the modulated data.

11. A modulation method for performing the modulation of recording data to be recorded on an optical disc, comprising the steps of:
   run-length modulating the recording data;
   inserting, at a predetermined insertion position other than that of the synchronization data, DSV control data comprised by two or more bits and adjusting the DSV value while observing the restrictions prescribed by the run-length modulation in relationship with the data patterns before and after the insertion position,
   wherein data giving the smallest inter-code interference in relation with the data patterns before and after the insertion position is inserted at the insertion position in place of the DSV control data when the restriction prescribed by the run-length modulation can no longer be observed if the DSV control data reducing the absolute value of the second DSV value is inserted into the modulated data.

12. A modulation method for performing the modulation of recording data to be recorded on an optical disc, comprising the steps of:
   run-length modulating the recording data;
   inserting, at a predetermined insertion position other than that of the synchronization data, DSV control data comprised by two or more bits and adjusting the DSV value while observing the restrictions prescribed by the run-length modulation in relationship with the data patterns before and after the insertion position, wherein use is made as the DSV control data of a candidate of the DSV control data capable of adjusting the DSV value while observing the restriction prescribed by the run-length modulation which gives the smallest inter-code interference at the insertion position when there are a plurality of the same.

13. A modulation method as set forth in claim 8, 9, 10, 11 or 12, wherein the optical disc is provided with an exclusive reproduction region and a recordable and reproducible region.

14. A demodulation method for demodulating recording data modulated by the run-length system and having inserted, at a predetermined insertion position other than that of the synchronization data, DSV control data comprised by two or more bits and adjusting the DSV value while observing the restrictions prescribed by the run-length modulation in relationship with the data patterns before and after the insertion position, comprising the steps of:

detecting the synchronization data contained in the recording data;

detecting the position of the DSV control data in the recording data based on the detected synchronization data;

removing the DSV control data contained in the recording data based on the detected position of the DSV control data; and run-length demodulating the recording data from which the DSV control data is removed.

* * * * *